(12) United States Patent
Weyerhaeuser et al.

(10) Patent No.: US 10,521,431 B2
(45) Date of Patent: Dec. 31, 2019

(54) RELATIONAL CONVERSION OF MULTIPROVIDER OPERATIONS IN A CALCULATION SCENARIO FOR EXECUTING A QUERY

(71) Applicant: SAP SE, Walldorf (DE)

(72) Inventors: Christoph Weyerhaeuser, Leimen (DE); Johannes Merx, Heidelberg (DE)

(73) Assignee: SAP SE, Walldorf (DE)

(*) Notice: Subject to any disclaimer, the term of this patent is extended or adjusted under 35 U.S.C. 154(b) by 416 days.

(21) Appl. No.: 15/150,368

(22) Filed: May 9, 2016

(65) Prior Publication Data

US 2017/0322988 A1    Nov. 9, 2017

(51) Int. Cl.
*G06F 16/2455*    (2019.01)

(52) U.S. Cl.
CPC ............... *G06F 16/24554* (2019.01)

(58) Field of Classification Search
CPC ............ G06F 17/30569; G06F 16/2455
USPC .................................................. 707/756
See application file for complete search history.

(56) References Cited

U.S. PATENT DOCUMENTS

| | | | | |
|---|---|---|---|---|
| 5,819,251 A * | 10/1998 | Kremer | ................. | G06F 16/284 |
| 6,820,073 B1 * | 11/2004 | Bedell | .................... | G06F 16/20 707/754 |
| 9,563,650 B2 * | 2/2017 | Balasubramanian | ....................... | G06F 16/211 |
| 9,619,514 B2 * | 4/2017 | Mindnich | ........... | G06F 16/2453 |
| 2002/0059203 A1 * | 5/2002 | Witkowski | ............ | G06F 16/244 |
| 2008/0162207 A1 * | 7/2008 | Gross | ........................ | G06F 8/35 703/2 |
| 2009/0070300 A1 * | 3/2009 | Bartels | ................ | G06F 16/2455 |
| 2012/0109934 A1 * | 5/2012 | Weyerhaeuser | .. | G06F 16/24547 707/713 |
| 2014/0344245 A1 * | 11/2014 | Weyerhaeuser | .. | G06F 16/24556 707/714 |
| 2014/0365464 A1 * | 12/2014 | Weyerhaeuser | ...... | G06F 16/242 707/714 |
| 2014/0372428 A1 * | 12/2014 | Mathis | .................. | G06F 16/258 707/736 |
| 2015/0120699 A1 * | 4/2015 | Faerber | ............. | G06F 16/24542 707/718 |
| 2015/0120746 A1 * | 4/2015 | Mindnich | ......... | G06F 17/30477 707/741 |

(Continued)

*Primary Examiner* — Pierre M Vital
*Assistant Examiner* — Nargis Sultana
(74) *Attorney, Agent, or Firm* — Mintz Levin Cohn Ferris Glovsky and Popeo, P.C.

(57) ABSTRACT

A calculation engine of a database management system is described. In an exemplary implementation, the calculation engine receives a calculation scenario. The calculation scenario includes one or more relational operations and one or more non-relational operations of a multiprovider, the multiprovider utilizing a plurality of database partitions. The calculation engine processes the one or more non-relational operations via the multiprovider. After processing the one or more non-relational operations, the calculation engine converts the one or more relational operations. This converting comprises filtering first data from the plurality of partitions to form second data and forming third data by performing a union operation on the second data. Thereafter, the third data is filtered to form fourth data. Related systems, methods, and articles of manufacture are also described.

16 Claims, 7 Drawing Sheets

(56) References Cited

U.S. PATENT DOCUMENTS

2015/0142773 A1\* 5/2015 Mindnich ......... G06F 16/24544
707/714
2015/0363463 A1\* 12/2015 Mindnich ........... G06F 16/2453
707/718

\* cited by examiner

RELATIONAL CONVERSION OF MULTIPROVIDER OPERATIONS IN A CALCULATION SCENARIO FOR EXECUTING A QUERY

TECHNICAL FIELD

The subject matter described herein relates to relational conversion of multiprovider operations in a calculation scenario for executing a query.

BACKGROUND

Calculation scenarios can consist of one or more multiproviders. A multiprovider is a special union operation combined with aggregation function(s), enhanced column mapping (constant mapping) information, and specialized filter processing. When executed, the multiprovider aggregates a plurality of part providers for data. A part provider is a semantic table partition that holds data (e.g., data for a specific accounting year and/or a specific account region). In some aspects, part providers may be referred to a "database partitions." Calculation scenarios utilizing multiproviders can produce useful non-relational results. However, when a relational view is stacked on top of the calculation scenario, a large number of intermediate results must be generated for the relational view to properly consume the results. The generation and processing of intermediate results can require additional computation time and result in unnecessary slowdown of the execution of queries.

SUMMARY

In an exemplary implementation, a calculation engine of a database management system receives a calculation scenario. The calculation scenario includes one or more relational operations and one or more non-relational operations of a multiprovider, the multiprovider utilizing a plurality of database partitions. The calculation engine processes the one or more non-relational operations via the multiprovider. After processing the one or more non-relational operations, the calculation engine converts the one or more relational operations. This converting comprises filtering first data from the plurality of partitions to form second data and forming third data by performing a union operation on the second data. Thereafter, the third data is filtered to form fourth data.

In some implementations, the above-noted aspects may further include features described herein, including one or more of the following: Providing the fourth data to a relational database engine external to the calculation engine. The plurality of database partitions comprise semantic table partitions that hold data from a database and the multiprovider comprises a logical definition for combining the plurality of database partitions. The fourth data comprises a table structure. The one or more relational operations comprises a logical operation performed utilizing one or more table structures. The one or more non-relational operations comprise a pruning of one or more of the partitions from the calculation scenario. The one or more non-relational operations comprise a filter push-down. The one or more non-relational operations comprise a join re-ordering. The one or more non-relational operations comprise an aggregation push-down. The calculation scenario comprises one or more database queries, the one or more database queries including the one or more relational operations and the one or more non-relational operations.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and one or more memory circuits coupled to the one or more data processors. The one or more memory circuits may temporarily or permanently store instructions that cause at least one processor to perform one or more of the operations described herein. In addition, methods can be implemented by one or more data processors either within a single computing system or distributed among two or more computing systems. Such computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

like reference symbols in the various drawings indicate like elements.

DETAILED DESCRIPTION

Calculation scenarios utilizing multiproviders can produce useful non-relational results. However, when a relational view is stacked on top of the calculation scenario, a large number of intermediate results must be generated for the relational view to properly consume the results. The generation and processing of intermediate results can require additional computation time and result in unnecessary slowdown of the execution of queries. The current subject matter is directed to processing calculation scenarios such that a large number of intermediate results are not required and processing time is decreased.

Figure 1:
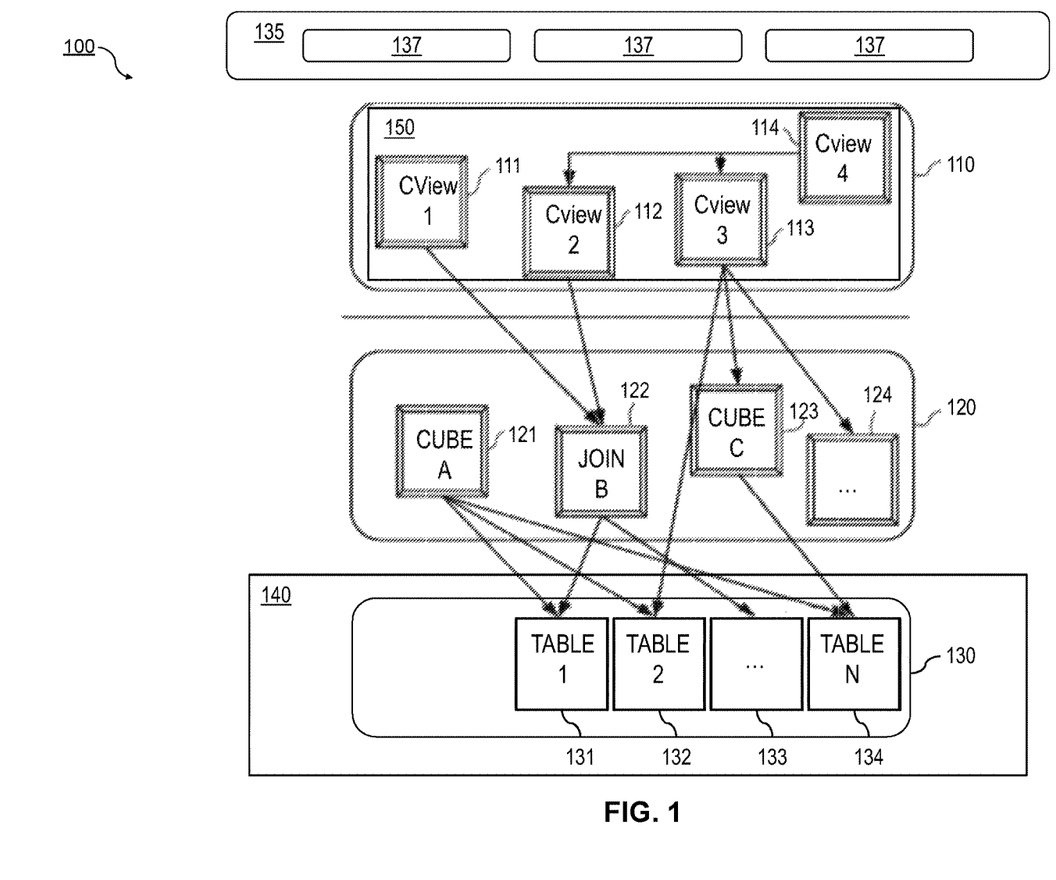
FIG. 1 is a diagram illustrating a computer architecture including a database system that includes three layers.

FIG. 1 is a diagram that illustrates a computing architecture 100 including a database system that includes three layers: a calculation engine layer 110, a logical layer 120, and a physical table-pool 130. One or more application servers 135 implementing database client applications 137 may access the database system 100. Calculation scenarios may be executed by a calculation engine, which may form part of a database or which can be part of the calculation engine layer 110 (which is associated with the database). The calculation engine layer 110 can be based on and/or interact with the other two layers, the logical layer 120 and/or the physical table pool 130. The basis of the physical table pool 130 consists of physical tables (called indexes) containing the data, which can be stored on one more database servers 140. Various tables 131-134 can be joined using logical metamodels 121-124 defined by the logical layer 120 to form an index. For example, the tables 131-134 in the illustrated $Cube_A$ metamodel 121 (e.g., an online analytical processing or "OLAP" index or other type of data structure) can be assigned roles (e.g., fact or dimension tables) and be joined to form a star schema or other type of schema. It is also possible to form join indexes (e.g. the $Join_B$ metamodel 122 in FIG. 1), which can act like database views in computing environments, such as the Fast Search Infrastructure (FSI) available from SAP SE of Walldorf, Germany.

As stated above, a calculation scenario 150 can include individual nodes 111-114 (e.g., calculation views), which in turn each define operations such as joining various physical or logical indexes and other calculation views (e.g., the $CView_4$ node 114 is illustrated as a join of the $CView_2$ node 112 and the $CView_3$ node 113). That is, the input for a node 111-114 can be one or more of a relational operation, a non-relational operation, or another node 111-114. Relational operations generally refer to operations that may be executed by a relational (e.g., SQL) engine. For example, joins, unions, aggregations, and/or the like are considered relational operations. On the other hand, non-relational operations can be operations that are not part of the standard relational engine's programming language (e.g., SQL standard) or may otherwise not be expressed in the programming language. For example, operations that can loop over intermediate results, scripted views/operators, procedural logic, currency conversion, multiproviders, and/or the like are considered non-relational operations.

In a calculation scenario 150 and/or calculation view node 111-114, two different representations can be provided including a pure calculation scenario in which all possible attributes are given and an instantiated model (also referred to herein as "optimized calculation scenario") that contains only the attributes requested in the query (and required for further calculations). Thus, calculation scenarios can be created that can be used for various queries. With such an arrangement, a calculation scenario 150 can be created which can be reused by multiple queries even if such queries do not require every attribute specified by the calculation scenario 150. Similarly, calculation views (e.g., nodes 111-114) may be created so that they may be reused in multiple calculation scenarios 150. This reusability can provide for simplified development of database queries.

Every calculation scenario 150 can be uniquely identifiable by a name (e.g., the calculation scenario 150 can be a database object with a unique identifier or some other indicia). Accordingly, the calculation scenario 150 can be queried in a manner similar to a view in a SQL database. Thus, the query is forwarded to the calculation node 111-114 for the calculation scenario 150 that is marked as the corresponding default node. In addition, a query can be executed on a particular calculation node 111-114 (as specified in the query). Furthermore, nested calculation scenarios can be generated in which one calculation scenario 150 is used as source in another calculation scenario (e.g. via a calculation node 111-114 in this calculation scenario 150). Each calculation node 111-114 can have one or more output tables. One output table can be consumed by several calculation nodes 111-114.

Figure 2:
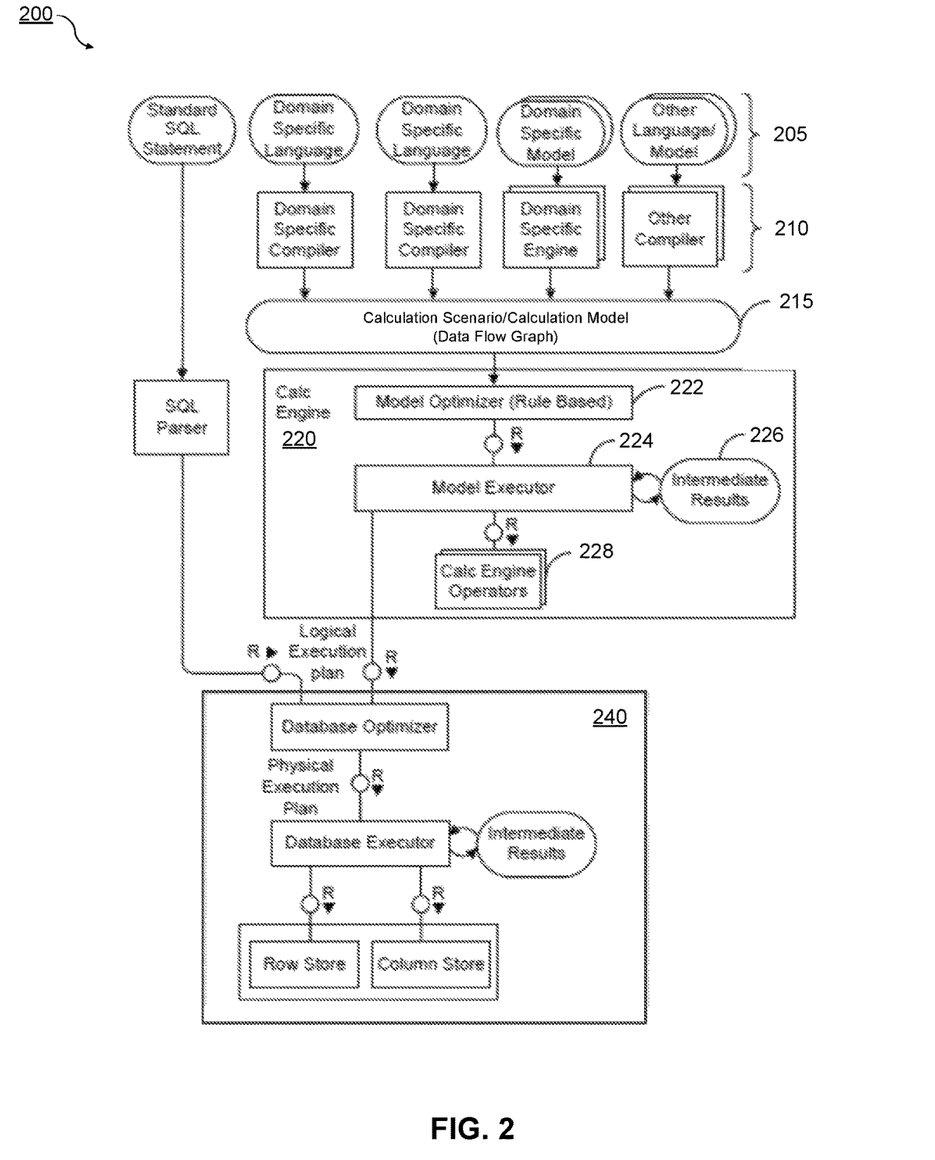
FIG. 2 is a functional block diagram illustrating a sample architecture for request processing and execution control.

FIG. 2 is a diagram illustrating a sample architecture 200 for request processing and execution control. As shown in FIG. 2, artifacts 205 in different domain specific languages can be translated by their specific compilers 210 into a common representation called a "calculation scenario" 215 (which may also referred to as a calculation model). Calculation scenario 215 may be similar to the calculation scenario 150 of FIG. 1. To achieve enhanced performance, the models and programs written in these languages can be executed inside a database server 240 (which may be similar to the database server 140 of FIG. 1). This arrangement eliminates the need to transfer large amounts of data between the database server 240 and a client application 137, which can be executed by the application server 135. Once the different artifacts 205 are compiled into this calculation scenario 215, they can be processed and executed in the same manner. A calculation engine 220 optimizes and/or executes the calculation scenarios 215. At least a portion of the illustrated architecture 200 may be implemented as a database management system (e.g., not including the artifacts 205).

A calculation scenario 215 can be represented as a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 137 at the application server 135). Inputs can be connected to tables or to the outputs of other nodes. A calculation scenario 215 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 215 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, they can use a split. Then, the nodes can be automatically multiplied between split and merge and partition the data.

A calculation scenario 215 can be defined as part of database metadata and invoked multiple times. A calculation scenario 215 can be created, for example, by a SQL statement "CREATE CALCULATION SCENARIO <NAME> USING <XML or JSON>". Once a calculation scenario 215 is created, it can be queried (e.g., "SELECT A, B, C FROM <scenario name>", etc.). In some cases, databases can have pre-defined calculation scenarios 215 (e.g., defaults, those previously defined by users, etc.). Calculation scenarios 215 can be persisted in a repository (coupled to the database server 240) or in transient scenarios. Calculation scenarios 215 can also be kept in-memory.

Calculation scenarios 215 may be considered more powerful than traditional SQL queries or SQL views for many reasons. One reason is the possibility to define parameterized calculation schemas that are specialized when the actual query is issued. Unlike a SQL view, a calculation scenario 215 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 215 may contain an aggregation node containing all attributes. Later, the attributes for grouping can be supplied with the query. This allows having a predefined generic aggregation, with the actual aggregation dimensions supplied at invocation time. The calculation engine 220 can use the actual parameters, attribute list, grouping attributes, and/or the like supplied with the invocation to instantiate a query specific calculation scenario 215. This instantiated calculation scenario 215 is optimized for the actual query and does not contain attributes, nodes or data flows that are not needed for the specific invocation.

When the calculation engine 220 gets a request to execute a calculation scenario 215, it can first optimize the calculation scenario 215 using a rule based model optimizer 222. Examples for optimizations performed by the model optimizer 222 can include "push down" filters and projections so that intermediate results 226 are narrowed down earlier during compilation or execution, or the combination of multiple aggregation and join operations into one node. The optimized model can then be executed by a calculation engine model executor 224 (a similar or the same model executor can be used by the database directly in some cases). This includes decisions about parallel execution of operations in the calculation scenario 215. The model executor 224 can invoke the required operators (using, for example, a calculation engine operators module 228) and manage intermediate results 226. Most of the operators can be executed directly in the calculation engine 220 (e.g., creating the union of several intermediate results 226). The remaining nodes of the calculation scenario 215 (not implemented in the calculation engine 220) can be transformed by the model executor 224 into a set of logical database execution plans. Multiple set operation nodes can be combined into one logical database execution plan if possible.

The attributes of the incoming datasets utilized by the rules of model optimizer 222 can additionally or alternatively be based on an estimated and/or actual amount of memory consumed by the dataset, a number of rows and/or columns in the dataset, and the number of cell values for the dataset, and the like.

A calculation scenario 215 as described herein can include a type of node referred to herein as a semantic node (or sometimes semantic root node). In some aspects, a database modeler can flag the root node (output) in a graphical calculation view to which the queries of the database applications are directed as semantic node. This arrangement allows the calculation engine 220 to easily identify those queries and to thereby provide a proper handling of the query in all cases.

The calculation scenarios 215 used by the calculation engine 220 can be exposed as a special type of database view called a graphical calculation view. For example, relational (e.g., SQL) views may be stacked on top of the calculation scenarios 215. Stacking in this manner may allow for a user to customize the front end of a program which utilizes calculation scenarios 215. A calculation view can be used in SQL queries and can be combined with tables and standard views using joins and sub queries. When such a query is executed, the database executor inside the SQL processor (not shown) needs to invoke the calculation engine 220 to execute the calculation scenario 215 behind the calculation view. In some implementations, the calculation engine 220 and the SQL processor are calling each other: on one hand the calculation engine 220 invokes the SQL processor for executing set operations and SQL nodes and, on the other hand, the SQL processor invokes the calculation engine 220 when executing SQL queries with calculation views.

However, because the calculation scenario 215 generally handles post-processing and formatting, the stacking of relational views and the non-relational calculation scenarios 215 requires additional time and processing power. For example, the non-relational calculation scenario 215 may be considered a "black box" to the relational view, which may in turn be prevented from utilizing optimization features (e.g., filter push down, join re-ordering, aggregation push down, etc.). Instead, the generation and utilization of a large number of intermediate results 226 may be required to compensate for these optimizations and otherwise allow for the stacked operations. Thus, it may be beneficial to convert calculation scenarios 215 into a structure that effectively makes it transparent to the relational views.

Filter push down may refer to filtering data prior to performing other operations. Similarly, aggregation push down may refer to aggregating data prior to performing other operations. For example, a table XYZ may comprise the following entries for [Product; Sales]: [Bike; 120], [Car; 1000], [Bike; 80], [Car, 4000]. The query "select sum(sales), product from XYZ where product='Bike'" will return [Bike; 200]. In order to arrive at this result, both filtering and aggregation may occur, and the order of each may be determined based on whether filter push down or aggregation push down is used. Depending upon the dataset in question, the order of a combined filter/aggregation push down will affect query execution time. Join re-ordering may refer to arranging the order in which multiple join operations are performed. For example, a query may require the inner join of tables A, B, and C. Thus, A join B produces AB, and AB join C produces the final result. However, A join C may be performed first to produce AC, and AC join B will also produce the same result. As above, depending upon the dataset in question, the order in which multiple joins are executed will affect query execution time. Thus, filter push down, join re-ordering, aggregation push down, etc. may be beneficial to reducing query execution time, and calculation scenarios 215 which do not allow for these optimizations can have slower query performance.

In various implementations, the calculation scenarios 215 may include multiproviders. In accordance with these implementations, a calculation engine 220 optimizer feature may be implemented which replaces the multiprovider operation(s) with several relational operators by keeping the multiprovider semantic (using, for example, a calculation engine operators module 228). In some aspects, the structure into which the multiproviders are converted may be consumable by a relational optimizer, which can be external to the calculation engine 220. Additionally, all possible optimizations of a non-relational optimizer (e.g., model optimizer 222) with respect to the multiproviders may be applied before the multiproviders are converted.

Figure 3:
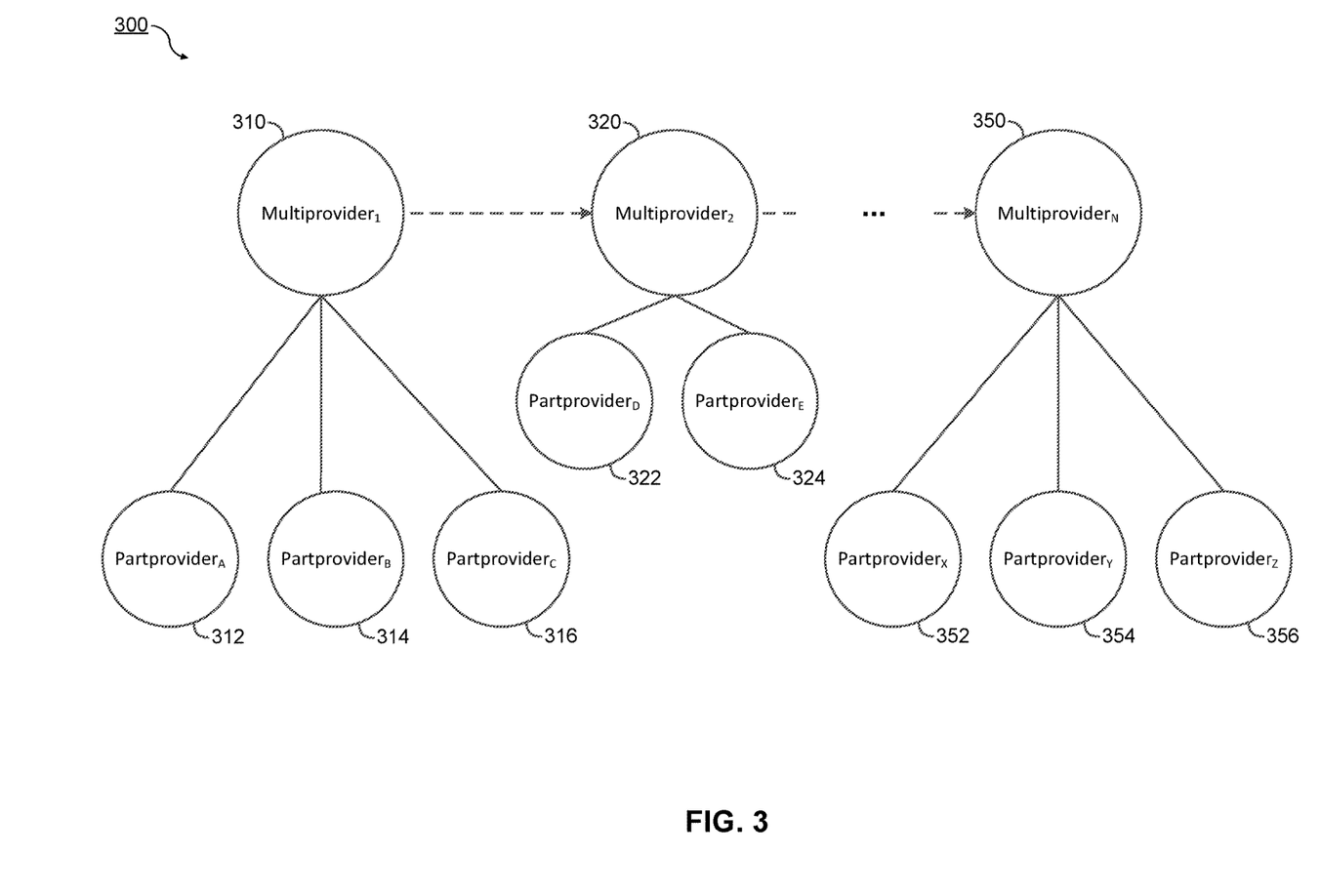
FIG. 3 is a diagram that illustrates an unoptimized model of a calculation scenario comprising a plurality of multiproviders.

FIG. 3 is a diagram that illustrates an unoptimized model of a calculation scenario 300 including a plurality of multiproviders 310, 320, 350 (referred to herein collectively as "multiproviders 310-350"). As illustrated, each of the multiproviders 310-350 utilize a plurality of part providers (referred to herein collectively as "part providers 312-356"). For example, multiprovider 310 utilizes part providers 312-316, multiprovider 320 utilizes part providers 322-324, and multiprovider 350 utilizes part providers 352-356. Calculation scenario 300 may be similar to the calculation scenario 150 of FIG. 1 or the calculation scenario 215 of FIG. 2. Although three multiproviders 310-350 are illustrated, more or less multiproviders may be present in the calculation scenario 300. Similarly, each multiprovider 310-350 may utilize more or less part providers 312-356 than illustrated. Additionally or alternatively, multiproviders may be stacked. For example, part provider 312 may be replaced with a multiprovider.

As noted above, a multiprovider 310-350 is a special union operation combined with aggregation function(s), enhanced column mapping information, and/or specialized filter processing. In some aspects, filters can have another semantic when applied on the enhanced column mapping, as opposed to a union operation. With multiproviders 310-350, it is also possible to specify delta queries, which can be seen as part provider 312-356 specific filter constraints.

When executed, the multiprovider 310 may filter and aggregate the plurality of part providers 312-316 for data. Each part provider 312-356 is a semantic table partition that holds data (e.g., data for a specific accounting year and/or a specific account region). In certain aspects, adjacent part providers, such as part provider 312 and 314 or part providers 316 and 322 may contain overlapping data. Thus, it can be advantageous to filter the data of the part providers 312-356 to avoid duplication.

Multiproviders 310-350 can contain a plurality of attributes, a measure sum, a constant mapping, and/or a plurality of delta queries. In an exemplary implementation, the plurality of attributes includes a city, a region, and a country. The multiprovider 310, for example, can include one or more delta queries and constant mappings. Each delta query or constant mapping corresponds to at least one of the part provider 312-316. Delta queries are filter constraints for part providers 312-316. For example, part provider 312 may have a delta query which filters based on year>2000 AND year<2015. Constant mapping can provide different operations for part providers 312-316 depending on the structure of the part provider 312-316. For example, part provider 314 may expose a "year" column and the mapping can be year=2015. In this case, a filter on the year column is applied, filtering for value 2015. In another example, part provider 316 may have no year column, and the mapping can be set to year=2014. In this case, a constant column is added to the part provider 316, resulting with the value of 2014 for all rows. In this calculation scenario 300, the delta queries may aggregate each of the part providers 312-316 for the mapping values every time multiprovider 310 is run. However, the calculation scenario 300 may be optimized such that one or more of the part providers 312-316 is pruned from the calculation scenario 300. For example, if a user query filter or delta query filter on a constant partprovider 312-316 mapping can be evaluated to false (e.g., constant mapping year=2014, filter year =2015). If the filter is evaluated to true the filter can be removed, which can avoid unnecessary filtering overhead during execution time.

Pruning is an example of a multiprovider-specific optimization. Other multiprovider-specific optimizations can include a multiprovider merge and a filter push-down. In some aspects, the calculation engine of FIG. 2 may be configured to execute or otherwise process each multiprovider-specific optimization of the calculation scenario 300 before converting the multiproviders 310-350 into relational operations. Once all multiprovider-specific optimizations of the calculation scenario 300 are implemented, the calculation engine 220 may next determine whether the multiproviders 310-350 contain hierarchy joins. Additionally or alternatively, the calculation engine 220 may determine whether any of the part providers 312-356 are logical operations (e.g., an OLAP operator and/or any other type of logical operator) which do not return a tabular result on query time (e.g., they return a view name). Further, the calculation engine 220 may determine whether any of the multiproviders 310-350 have a Form Element Selection (FEMS) query on top. In some aspects, FEMS can be filter conditions for a restricted keyfigure used to convert a row-based database result set to a cell format specified by a user. If any of these conditions are met, then the calculation engine may determine that the calculation scenario 300 is optimized, and may proceed to execute it (or pass the calculation scenario 300 to another module for execution). If not, then the calculation engine 220 may implement additional optimizations (e.g., convert the multiproviders 310-350) explained with more detail with respect to FIG. 4.

Figure 4:
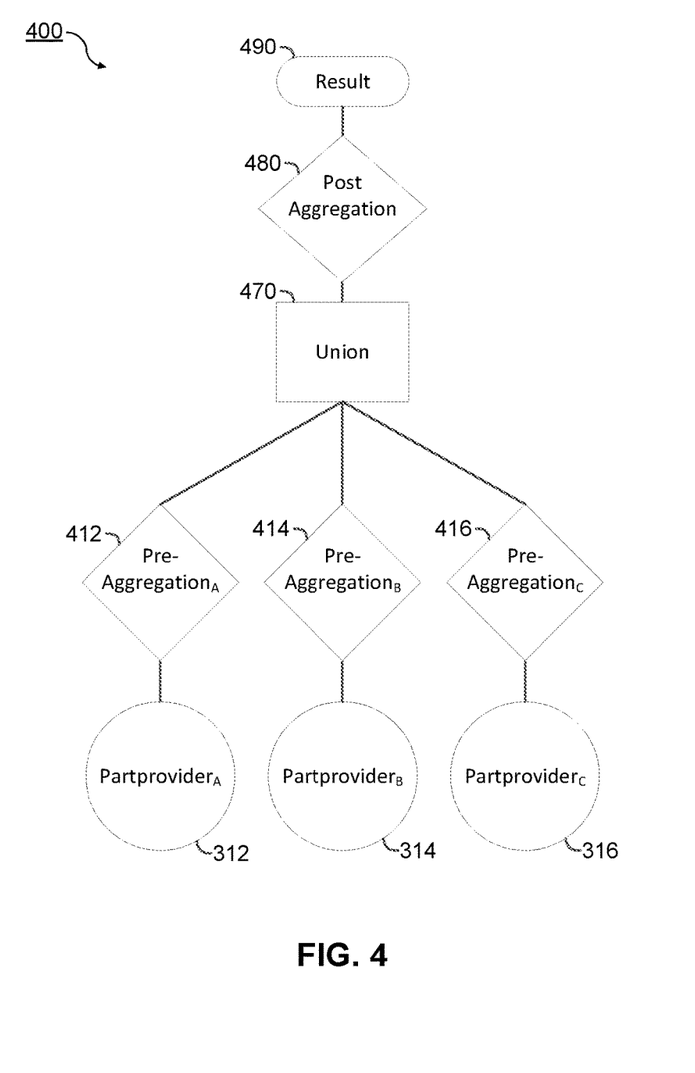
FIG. 4 is a diagram that illustrates a converted model of a calculation scenario which does not comprise multiproviders.

FIG. 4 is a diagram that illustrates a converted model of a calculation scenario 400 which does not comprise multiproviders. Calculation scenario 400 may be understood as a directed acyclic graph of calculation nodes. In comparison to the calculation scenario 300 of FIG. 3, the calculation scenario 400 comprises filter pre-aggregation operators 412-416 (illustrated as "pre-aggregation" filters) after each part provider 312-316, a union operation 470 into which all of the filter pre-aggregation operators 412-416 are fed, and a post-aggregation operator 480 after the union operation 470. The result 490 of the post-aggregation operator 480 (and thereby the calculation scenario 400) may be pushed to a relational optimizer (e.g., an online analytical process (OLAP) engine), and may thereby provide additional processing optimizations for database queries. These optimizations may be possible due to the response time and query performance of relational optimizers. In some aspects, the result 490 may comprise a table of data.

From a high level perspective, the multiprovider 310 of FIG. 3 is replaced by the union operator 470 followed by the post-aggregation operator 480. The semantic of constant mapping and delta queries in the multiprovider 310 are compensated by individual filter pre-aggregation operators 412-416 for each part provider 312-316. Each of the filter pre-aggregation operators 412-416 can reduce the number of intermediary results. These replacements may be possible without any change on the original calculation scenario 300.

In terms of execution, the conversion itself can first create the post-aggregation operator 480 in the directed acyclic graph of calculation nodes within the calculation scenario 400. The post-aggregation operator 480 takes over the grouping part and is added as predecessor of the multiprovider operator 310. The multiprovider operator 310 itself is replaced by the union operator 370, which takes over the combination of the results of the part providers 312-316. In certain aspects, each of the part providers 312-316 may need to have the same structure so that a union may be effectuated.

If enhanced constant mapping is used or a delta query is specified for a part provider, this is compensated by introducing a pre-aggregation operator 412-416 with a corresponding filter on top of the part provider 312-316. If enhanced constant mapping is used along with a delta query, the resulting filter pre-aggregation 412-416 may have to be created in an appropriate way. After the successful conversion into relational operators, the calculation scenario 400 can be transformed into a structure (e.g., result 490) that is consumable by the relational optimizer. Through this conversion, further exploitation of the relational optimizer may be realized, even for multiprovider scenarios which require non-relational optimizations. For example, the overall query runtime can be reduced significantly since non-relational and relational optimizations are applied.

Figure 5:
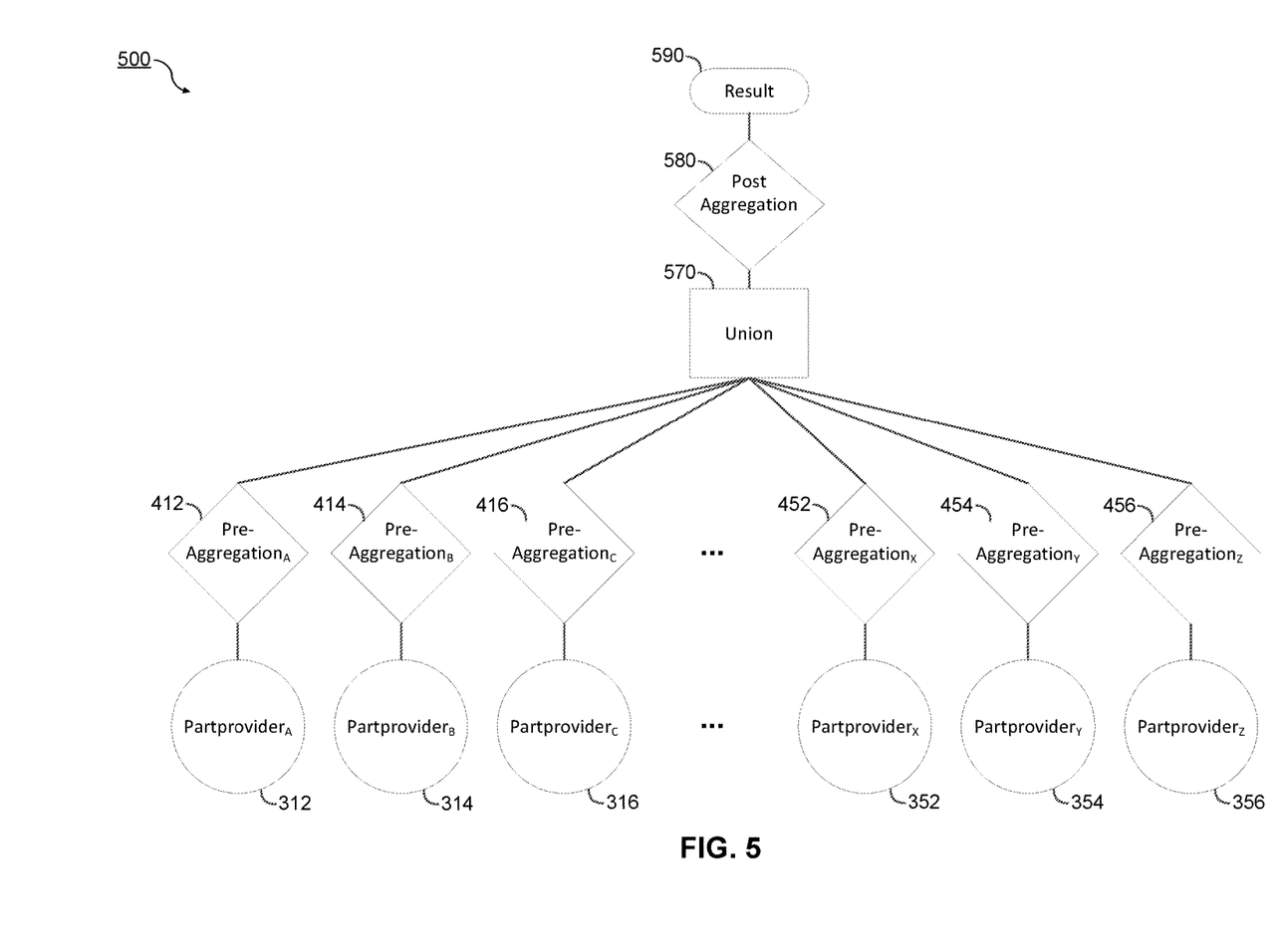
FIG. 5 is a diagram that illustrates another converted model of a calculation scenario which does not comprise multiproviders.

Although only one "converted" multiprovider 310 is illustrated in FIG. 4, it is possible to convert a plurality of multiproviders 310-350. For example, FIG. 5 is a diagram that illustrates another converted model of a calculation scenario 500 which does not comprise multiproviders. As illustrated, a filter projection operator 412-456 may be present after each of the part providers 312-356. Thereafter, the results of all of the filter projection operators 412-456 may be processed by a union operation 570 to form a union of the filtered data from the part providers 312-356. The data generated as a result of the union operation 570 may be run through a post-aggregation operator 580 to generate result 590. As above, these results may be processed by a relational engine.

Figure 6:
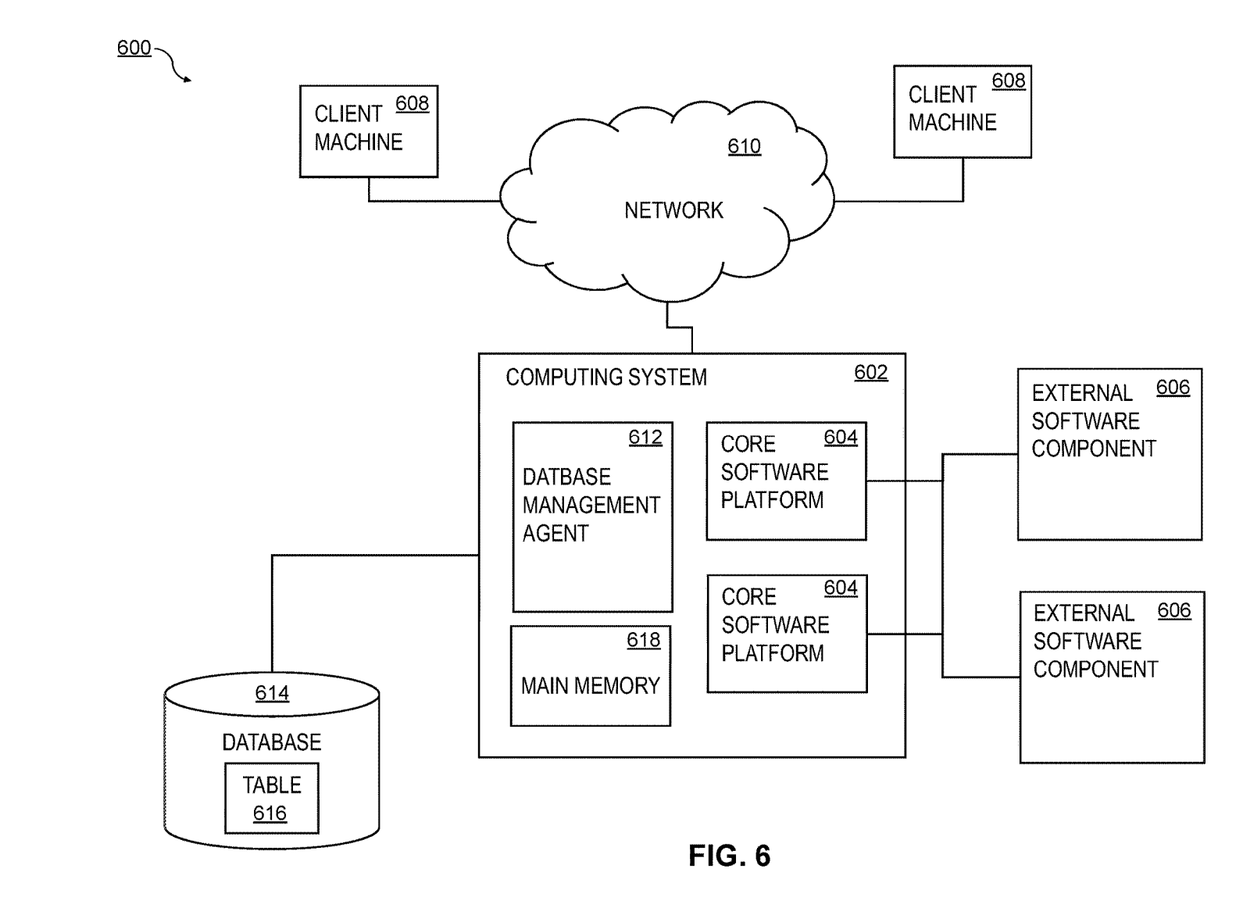
FIG. 6 is a diagram of a system that can implement one or more features consistent with the current subject matter.

FIG. 6 is a diagram of a system 600 that can implement one or more features consistent with the current subject matter. A computing system 602 can include one or more core software platform modules 604 providing one or more features of a high-level programming software system or other software that includes database management features. The computing system can also aggregate or otherwise provide a gateway via which users can access functionality provided by one or more external software components 606. One or more client machines 608 can access the computing system, either via a direct connection, a local terminal, or over a network 610 (e.g. a local area network, a wide area network, a wireless network, the Internet, or the like).

A database management agent 612 or other comparable functionality can access a database 614 that includes at least one table 616, which can in turn include at least one column. The database management agent 612 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 612 or other comparable functionality can be configured to load a database table 616, or other comparable data set, into the main memory 618. The database management agent 612 can be configured to load the information from the database 614 to the main memory 618 in response to receipt of a query instantiated by a user or computer system through one or more client machines 608, external software components 606, core software platforms 604, or the like. At least a portion of the illustrated system 600 may be implemented as a database management system (e.g., not including the client machines 608, the network 610, and/or the external software components 606). In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

Figure 7:
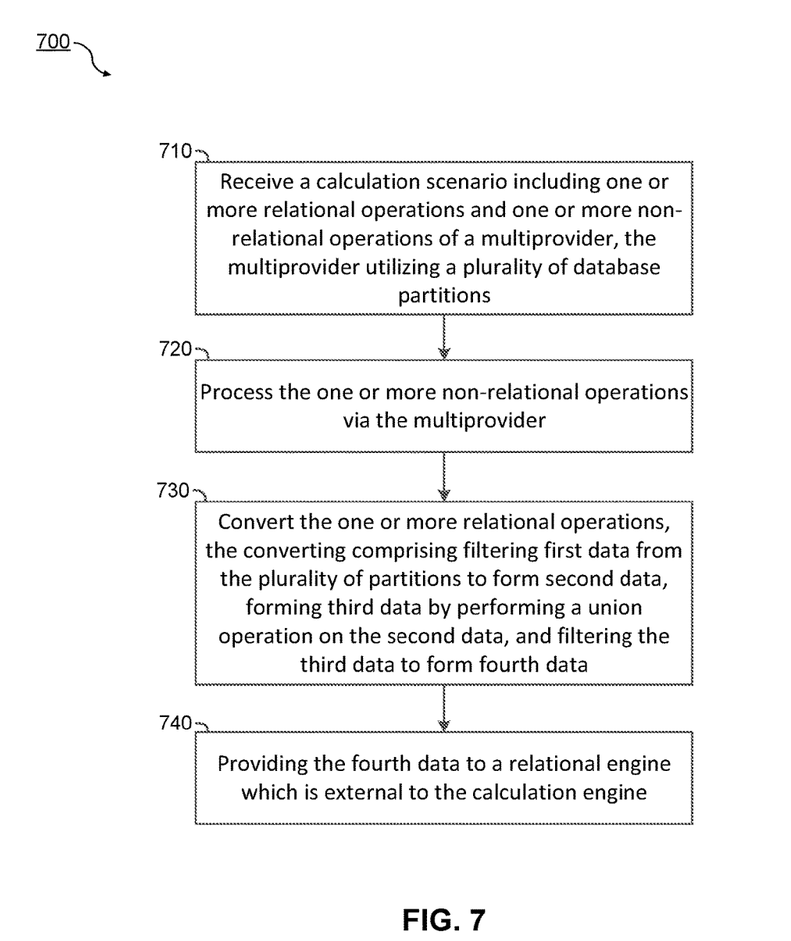
FIG. 7 is a process flow diagram illustrating an exemplary method of processing a calculation scenario for executing a query.

FIG. 7 is a process flow diagram illustrating an exemplary method 700 of processing a calculation scenario for executing a query. In various implementations, the method 700 may be performed by the calculation engine 220 of FIG. 2, the computing system 602 of FIG. 6, or other hardware and/or software components described herein, or equivalents thereof. Although illustrated in linear fashion, in various implementations, the steps of the method 700 may be executed in a different order, and not all of the steps of method 700 may be required or executed.

At operational block 710 the calculation engine 220, for example, receives a calculation scenario including one or more relational operations and one or more non-relational operations of a multiprovider, the multiprovider utilizing a plurality of database partitions. In some aspects, the plurality of database partitions comprise semantic table partitions (e.g., a part provider 312-356) that hold data from a database and the multiprovider comprises a logical definition for combining the plurality of database partitions. In some aspects, the one or more relational operations comprise a logical operation performed utilizing one or more table structures. In some aspects, the calculation scenario can include one or more database queries, the one or more database queries including the one or more relational operations and the one or more non-relational operations.

At operational block 720 the calculation engine 220, for example, processes the one or more non-relational operations via the multiprovider. In some aspects, the one or more non-relational operations can include one or more of a pruning of one or more of the partitions from the calculation scenario, a filter push-down, a join re-ordering, or an aggregation push-down.

At operational block 730 the calculation engine 220, for example, converts the one or more relational operations, the converting comprising: filtering first data from the plurality of partitions to form second data, forming third data by performing a union operation on the second data, and filtering the third data to form fourth data. In a preferred implementation, the conversion occurs after the processing in operational block 720. In some aspects, the third data comprises a logical plan which contains only relational operators (due to the prior multiprovider conversion steps). The third data may be passed to a relational engine which integrates and executes the plan and generates the fourth data. This passing of data may be referred to as passing execution control to the relational engine. In some aspects, the fourth data comprises a table structure (e.g., one or more rows and columns).

At operational block 740 (illustrated with dashed lines) the calculation engine 220, for example, provides the fourth data to a relational engine which is external to the calculation engine. The external relational engine may comprise one or more of the compilers 210 of FIG. 2.

In some implementations, the calculation engine can comprise at least one programmable processor and at least one memory storing instructions that, when executed by the at least one programmable processor to implement the receiving, the processing, the converting, and the providing of operational blocks 710-740.

Without in any way limiting the scope, interpretation, or application of the claims appearing below, a technical effect of one or more of the example embodiments disclosed herein is more efficient execution of complex calculation scenarios while allowing a developer to develop less complex software. For example, new software for databases may be deployed on top of currently existing software while still maintaining some of the benefits of the existing software and gaining additional benefits from the new software.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, at a calculation engine of a database management system, a query invoking a calculation scenario including one or more relational operations performed on one or more table structures and one or more non-relational operations performed on a multiprovider utilizing a plurality of part providers, each of the plurality of part providers comprising a database partition comprising a semantic table partition holding data from a database, and the multiprovider comprising a logical definition for combining the plurality of part providers; and
executing the query by at least processing, by the calculation engine, the calculation scenario, the processing of the calculation scenario comprising:

performing, by the calculation engine, the one or more non-relational operations via the multiprovider, the multiprovider configured to filter and aggregate the plurality of part providers, and the performance of the one or more non-relational operation including
replacing the multiprovider with a union operator followed by a post-aggregation operator, the union operator configured to combine a result from the plurality of part providers, and the post-aggregation operator configured to group the result from the plurality of part providers, and
providing, to a relational database engine external to the calculation engine, an output of the post-aggregation operator; and
converting, by the calculation engine, the one or more relational operations, the converting including
filtering first data from the plurality of part providers to form second data,
forming third data by performing a union operation on the second data, and
filtering the third data to form a fourth data for consumption by the relational database engine external to the calculation engine.

2. The method of claim 1, further comprising:
providing, from the calculation engine, the fourth data to the relational database engine for generating, based at least on the fourth data, a relational view.

3. The method of claim 1, wherein the fourth data comprises a table structure.

4. The method of claim 1, wherein the one or more relational operations comprises a logical operation performed utilizing the one or more table structures.

5. The method of claim 1, wherein the one or more non-relational operations comprises a pruning of one or more of the partitions from the calculation scenario.

6. The method of claim 1, wherein the one or more non-relational operations comprises a filter push-down.

7. The method of claim 1, wherein the one or more non-relational operations comprises a join re-ordering.

8. The method of claim 1, wherein the one or more non-relational operations comprises an aggregation push-down.

9. The method of claim 1, wherein the calculation engine comprises at least one programmable processor and at least one memory storing instructions that, when executed by the at least one programmable processor to implement the receiving, the processing, and the converting.

10. The method of claim 1, wherein the third data comprises a logical plan containing one or more relational operators, and wherein the third data is passed to the relational database engine for generating, by at least integrating and executing the logical plan, the fourth data.

11. A non-transitory computer program product storing instructions which, when executed by at least one hardware data processors, result in operations comprising:
receiving, at a calculation engine of a database management system, a query invoking a calculation scenario including one or more relational operations performed on one or more table structures and one or more non-relational operations performed on a multiprovider utilizing a plurality of part providers, each of the plurality of part providers comprising a database partition comprising a semantic table partition holding data from a database, and the multiprovider comprising a logical definition for combining the plurality of part providers; and
executing the query by at least processing, by the calculation engine, the calculation scenario, the processing of the calculation scenario comprising:
performing, by the calculation engine, the one or more non-relational operations via the multiprovider, the multiprovider configured to filter and aggregate the plurality of part providers, and the performance of the one or more non-relational operation including
replacing the multiprovider with a union operator followed by a post-aggregation operator, the union operator configured to combine a result from the plurality of part providers, and the post-aggregation operator configured to group the result from the plurality of part providers, and
providing, to a relational database engine external to the calculation engine, an output of the post-aggregation operator; and
converting, by the calculation engine, the one or more relational operations, the converting including
filtering first data from the plurality of part providers to form second data,
forming third data by performing a union operation on the second data, and
filtering the third data to form a fourth data for consumption by the relational database engine external to the calculation engine.

12. The non-transitory computer program product of claim 11, wherein the operations further comprise:
providing, from the calculation engine, the fourth data to the relational database engine for generating, based at least on the fourth data, a relational view.

13. The non-transitory computer program product of claim 11, wherein the one or more non-relational operations comprise a pruning of one or more of the partitions from the calculation scenario, a filter push-down, a join re-ordering, and/or an aggregation push-down.

14. A system comprising:
at least one hardware data processor; and
at least one memory storing instructions which, when executed by the at least one data processor, result in operations comprising:
receiving, at a calculation engine of a database management system, a query invoking a calculation scenario including one or more relational operations performed on one or more table structures and one or more non-relational operations performed on a multiprovider utilizing a plurality of part providers, each of the plurality of part providers comprising a database partition comprising a semantic table partition holding data from a database, and the multiprovider comprising a logical definition for combining the plurality of part providers; and
executing the query by at least processing, by the calculation engine, the calculation scenario, the processing of the calculation scenario comprising:
performing, by the calculation engine, the one or more non-relational operations via the multiprovider, the multiprovider configured to filter and aggregate the plurality of part providers, and the performance of the one or more non-relational operation including
replacing the multiprovider with a union operator followed by a post-aggregation operator, the union operator configured to combine a result from the plurality of part providers, and the post-aggregation operator configured to group the result from the plurality of part providers, and providing, to a relational database engine external to the calculation engine, an output of the post-aggregation operator; and converting, by the calculation engine, the one or more relational operations, the converting including
filtering first data from the plurality of part providers to form second data,
forming third data by performing a union operation on the second data, and
filtering the third data to form a fourth data for consumption by the relational database engine external to the calculation engine.

15. The system of claim 14, wherein the operations further comprise:
providing, from the calculation engine, the fourth data to the relational database engine for generating, based at least on the fourth data, a relational view.

16. The system of claim 14, wherein the plurality of database partitions comprise semantic table partitions that hold data from a database, and wherein the multiprovider comprises a logical definition for combining the plurality of database partitions.

\* \* \* \* \*